(12) United States Patent
Kariatsumari et al.

(10) Patent No.: US 8,874,316 B2
(45) Date of Patent: *Oct. 28, 2014

(54) VEHICLE STEERING SYSTEM

(75) Inventors: Yuji Kariatsumari, Yamatotakada (JP);
Terutaka Tamaizumi, Okazaki (JP);
Isao Namikawa, Okazaki (JP)

(73) Assignee: JTEKT Corporation, Osaka-Shi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/205,138

(22) Filed: Aug. 8, 2011

(65) Prior Publication Data

US 2012/0046832 A1 Feb. 23, 2012

(30) Foreign Application Priority Data

Aug. 23, 2010 (JP) ................................. 2010-186220

(51) Int. Cl.
*B62D 5/04* (2006.01)
*B62D 5/14* (2006.01)

(52) U.S. Cl.
CPC .............. *B62D 5/046* (2013.01); *B62D 5/0463* (2013.01)
USPC ................................. 701/41; 701/42; 180/443

(58) Field of Classification Search
CPC ..... B62D 5/046; B62D 5/0463; B62D 5/0472
USPC ............... 701/41–42; 180/412–423, 443–447
See application file for complete search history.

(56) References Cited

U.S. PATENT DOCUMENTS

| | | |
|---|---|---|
| 5,513,720 A | 5/1996 | Yamamoto et al. |
| 5,568,389 A | 10/1996 | McLaughlin et al. |
| 5,928,298 A | 7/1999 | Matsuoka et al. |
| 6,364,051 B1 | 4/2002 | Kada et al. |
| 6,396,229 B1 | 5/2002 | Sakamoto et al. |
| 6,397,969 B1 | 6/2002 | Kasai et al. |
| 6,781,333 B2 | 8/2004 | Koide et al. |

(Continued)

FOREIGN PATENT DOCUMENTS

| | | |
|---|---|---|
| EP | 1 487 098 A1 | 12/2004 |
| EP | 1 955 926 A2 | 8/2008 |

(Continued)

OTHER PUBLICATIONS

European Search Report issued in European Patent Application No. 11177780.1-1264 / 2423074 dated Sep. 19, 2012.

(Continued)

*Primary Examiner* — Helal A Algahaim
*Assistant Examiner* — Charles J Han
(74) *Attorney, Agent, or Firm* — Oliff PLC

(57) ABSTRACT

A current increase-decrease amount ($\Delta I_\gamma^*$) computed by a command current increase-decrease amount computing unit is added to an immediately preceding value ($I_\gamma^*(n-1)$) of a command current value ($I_\gamma^*$) in an adder. The command current value ($I_\gamma^*$) obtained by the adder is given to a high/low limit limiter. The high/low limit limiter limits the command current value ($I_\gamma^*$), obtained by the adder, to a value between a low limit value ($\xi_{min}$ ($\xi_{min} \geq 0$)) and a high limit value ($\xi_{max}$ ($\xi_{max} > \xi_{min}$)). A high limit value setting unit obtains the high limit value ($\xi_{max}$) corresponding to the vehicle speed detected by the vehicle speed sensor, from a vehicle speed-vs.-high limit value map set by a map creating/updating unit, and sets the obtained high limit value ($\xi_{max}$) in the high/low limit limiter.

7 Claims, 10 Drawing Sheets

(56) References Cited

U.S. PATENT DOCUMENTS

| | | | |
|---|---|---|---|
| 7,076,340 | B1 | 7/2006 | Inazumi et al. |
| 2002/0026270 | A1 | 2/2002 | Kurishige et al. |
| 2002/0180402 | A1* | 12/2002 | Koide et al. .................. 318/727 |
| 2003/0030404 | A1* | 2/2003 | Iwaji et al. .................. 318/700 |
| 2004/0267421 | A1* | 12/2004 | Eskritt et al. .................. 701/41 |
| 2005/0029972 | A1 | 2/2005 | Imai et al. |
| 2005/0257994 | A1 | 11/2005 | Fujita |
| 2005/0273236 | A1 | 12/2005 | Mori et al. |
| 2006/0086561 | A1 | 4/2006 | Hidaka |
| 2006/0090954 | A1 | 5/2006 | Sugitani et al. |
| 2006/0125439 | A1 | 6/2006 | Ajima et al. |
| 2007/0040528 | A1 | 2/2007 | Tomigashi et al. |
| 2007/0229021 | A1 | 10/2007 | Yoshia et al. |
| 2007/0273317 | A1* | 11/2007 | Endo et al. .................. 318/432 |
| 2007/0284181 | A1 | 12/2007 | Muranaka |
| 2008/0035411 | A1 | 2/2008 | Yamashita et al. |
| 2008/0047775 | A1 | 2/2008 | Yamazaki |
| 2008/0128197 | A1 | 6/2008 | Kawaguchi et al. |
| 2008/0201041 | A1* | 8/2008 | Jiang .................. 701/42 |
| 2009/0069979 | A1 | 3/2009 | Yamashita et al. |
| 2009/0240389 | A1 | 9/2009 | Nomura et al. |
| 2010/0057300 | A1 | 3/2010 | Nishiyama |
| 2010/0094505 | A1 | 4/2010 | Kariatsumari et al. |
| 2010/0198462 | A1 | 8/2010 | Shinoda et al. |
| 2010/0263709 | A1 | 10/2010 | Norman et al. |
| 2011/0035114 | A1 | 2/2011 | Yoneda et al. |
| 2012/0080259 | A1 | 4/2012 | Ueda et al. |

FOREIGN PATENT DOCUMENTS

| | | | |
|---|---|---|---|
| EP | 2 086 106 A2 | 8/2009 | |
| EP | 2 159 133 A1 | 3/2010 | |
| EP | 2 177 422 A2 | 4/2010 | |
| EP | 2 216 895 A2 | 8/2010 | |
| JP | A 4-161085 | 6/1992 | |
| JP | A 6-305436 | 11/1994 | |
| JP | A 09-226606 | 9/1997 | |
| JP | A 10-76960 | 3/1998 | |
| JP | A-10-243699 | 9/1998 | |
| JP | A 10-243699 | 9/1998 | |
| JP | A 2000-050689 | 2/2000 | |
| JP | A 2001-37281 | 2/2001 | |
| JP | A 2001-251889 | 9/2001 | |
| JP | A 2002-359996 | 12/2002 | |
| JP | A 2003-125594 | 4/2003 | |
| JP | A 2003-182620 | 7/2003 | |
| JP | A 2007-53829 | 3/2007 | |
| JP | A 2007-267549 | 10/2007 | |
| JP | A 2008-024196 | 2/2008 | |
| JP | A 2008-087756 | 4/2008 | |
| JP | A 2009-124811 | 6/2009 | |
| JP | A-2009-124811 | 6/2009 | |
| JP | A 2010-178549 | 8/2010 | |
| WO | WO 2007/139030 A1 | 12/2007 | |
| WO | WO 2009138830 A1 * | 11/2009 | ............... B62D 5/04 |

OTHER PUBLICATIONS

U.S. Appl. No. 12/823,573, filed Jun. 25, 2010.
U.S. Appl. No. 13/685,152, filed Nov. 26, 2012.
U.S. Appl. No. 12/696,604, filed Jan. 29, 2010.
U.S. Appl. No. 12/945,101, filed Nov. 12, 2010.
U.S. Appl. No. 12/946,187, filed Nov. 15, 2010.
U.S. Appl. No. 12/943,514, filed Nov. 10, 2010.
U.S. Appl. No. 12/997,168, filed Dec. 9, 2010.
Feb. 6, 2014 Office Action issued in U.S. Appl. No. 12/823,573.
Sep. 5, 2013 Office Action issued in U.S. Appl. No. 12/823,573.
Mar. 21, 2013 Office Action issued in U.S. Appl. No. 12/823,573.
Dec. 10, 2012 Office Action issued in U.S. Appl. No. 12/823,573.
Jun. 19, 2012 Office Action issued in U.S. Appl. No. 12/823,573.
Nov. 7, 2013 Office Action issued in U.S. Appl. No. 13/685,152.
Jul. 17, 2013 Office Action issued in U.S. Appl. No. 13/685,152.
Jul. 20, 2010 Search Report issued in European Patent Application No. 10156226.
May 24, 2012 Office Action issued in U.S. Appl. No. 12/721,855.
Feb. 6, 2014 Office Action issued in U.S. Appl. No. 12/696,604.
Jul. 15, 2013 Office Action issued in U.S. Appl. No. 12/696,604.
Mar. 25, 2013 Office Action issued in U.S. Appl. No. 12/696,604.
Nov. 29, 2012 Office Action issued in U.S. Appl. No. 12/696,604.
Jun. 12, 2012 Office Action issued in U.S. Appl. No. 12/696,604.
Feb. 12, 2014 Office Action issued in U.S. Appl. No. 12/945,101.
Nov. 28, 2013 Office Action issued in Japanese Patent Application No. 2009-258962 (with translation).
Jul. 19, 2013 Office Action issued in U.S. Appl. No. 12/945,101.
Mar. 26, 2013 Office Action issued in U.S. Appl. No. 12/945,101.
Dec. 11, 2012 Office Action issued in U.S. Appl. No. 12/945,101.
Aug. 9, 2012 Office Action issued in U.S. Appl. No. 12/945,101.
Feb. 6, 2014 Office Action issued in U.S. Appl. No. 12/946,187.
Sep. 10, 2013 Office Action issued in U.S. Appl. No. 12/946,187.
Jul. 15, 2013 Office Action issued in U.S. Appl. No. 12/946,187.
Sep. 19, 2012 Office Action issued in U.S. Appl. No. 12/946,187.
Feb. 6, 2014 Office Action issued in U.S. Appl. No. 12/997,168.
Sep. 10, 2013 Office Action issued in U.S. Appl. No. 12/997,168.
Mar. 25, 2013 Office Action issued in U.S. Appl. No. 12/997,168.
Aug. 14, 2012 Office Action issued in U.S. Appl. No. 12/997,168.
Feb. 8, 2011 International Preliminary Report on Patentability issued in International Patent Application No. PCT/JP2009/002991 (with translation).
Oct. 6, 2009 Search Report issued in International Patent Application No. PCT/JP2009/002991 (with translation).
Jun. 8, 2011 Extended European Search Report issued in European Patent Application No. 10191142.8.
Feb. 10, 2014 Office Action issued in U.S. Appl. No. 12/943,514.
Sep. 10, 2013 Office Action issued in U.S. Appl. No. 12/943,514.
Aug. 31, 2012 Office Action issued in U.S. Appl. No. 12/943,514.
Mar. 22, 2013 Office Action issued in U.S. Appl. No. 12/943,514.
Notice of Reasons for Rejection issued in Japanese Patent Application No. 2010-186220; mailed May 22, 2014; with English-language translation.

* cited by examiner

VEHICLE STEERING SYSTEM

INCORPORATION BY REFERENCE

The disclosure of Japanese Patent Application No. 2010-186220 filed on Aug. 23, 2010 including the specification, drawings and abstract, is incorporated herein by reference in its entirety.

BACKGROUND OF THE INVENTION

1. Field of the Invention

The invention relates to a vehicle steering system that includes a motor control device for driving a brushless motor. One example of the vehicle steering system is an electric power steering system.

2. Description of Related Art

A motor control device for carrying out drive control over a brushless motor is generally configured to control current that is supplied to the motor based on a signal output from a rotation angle sensor for detecting the rotation angle of a rotor. However, when the rotation angle sensor fails, motor control is no longer continued. Then, there has been suggested a sensorless drive method according to which a brushless motor is driven without using a rotation angle sensor. The sensorless drive method is a method for estimating the phase of a magnetic pole (the electrical angle of a rotor) by estimating induced voltage resulting from rotation of the rotor. During stop of the rotor or during extremely low speed rotation, induced voltage cannot be estimated, so the phase of the magnetic pole is estimated according to another method. Specifically, a sensing signal is transmitted to a stator and then a response of the motor to the sensing signal is detected. A rotor rotation position is estimated based on the response of the motor. For example, Japanese Patent Application Publication No. 10-243699 (JP-A-10-243699) and Japanese Patent Application Publication No. 2009-124811 (JP-A-2009-124811) describe related arts.

According to the sensorless drive method, induced voltage and a sensing signal are used to estimate the rotation position of the rotor and then the motor is controlled based on the estimated rotation position. However, this drive method is not suitable for all applications. A method for applying the sensorless drive method to control over a brushless motor that is used as a driving source of a vehicle steering system, such as an electric power steering system that applies steering assist force to a steering mechanism of a vehicle, has not yet established. Therefore, another method for implementing sensorless control is expected.

SUMMARY OF THE INVENTION

It is an object of the invention to provide a vehicle steering system in which a motor is controlled according to a new control method in which a rotation angle sensor is not used.

A first aspect of the invention relates to a vehicle steering system that applies a driving force to a steering mechanism of a vehicle using a motor having a rotor and a stator that faces the rotor. The vehicle steering system includes: a current driving device that drives the motor based on an axis current value on a rotation coordinate system that rotates in accordance with a control angle used as a rotation angle in control; a control angle computing device that obtains a present value of the control angle by adding an addition angle to an immediately preceding value of the control angle in each predetermined computation cycle; a vehicle speed detecting device that detects a speed of the vehicle; a steering torque detecting device that detects a steering torque applied to an operating member that is operated to steer the vehicle; a command steering torque setting device that sets a command steering torque used as a target value of the steering torque; an addition angle computing device that computes the addition angle based on a torque deviation that is a deviation between the detected steering torque detected by the steering torque detecting device and the command steering torque set by the command steering torque setting device; a command current value computing device that obtains a command current value that is a target value of the axis current value based on the torque deviation; a command current value limiting device that limits the command current value, obtained by the command current value computing device, to a value at or below a high limit value; and a high limit value setting device that sets the high limit value based on the vehicle speed detected by the vehicle speed detecting device.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
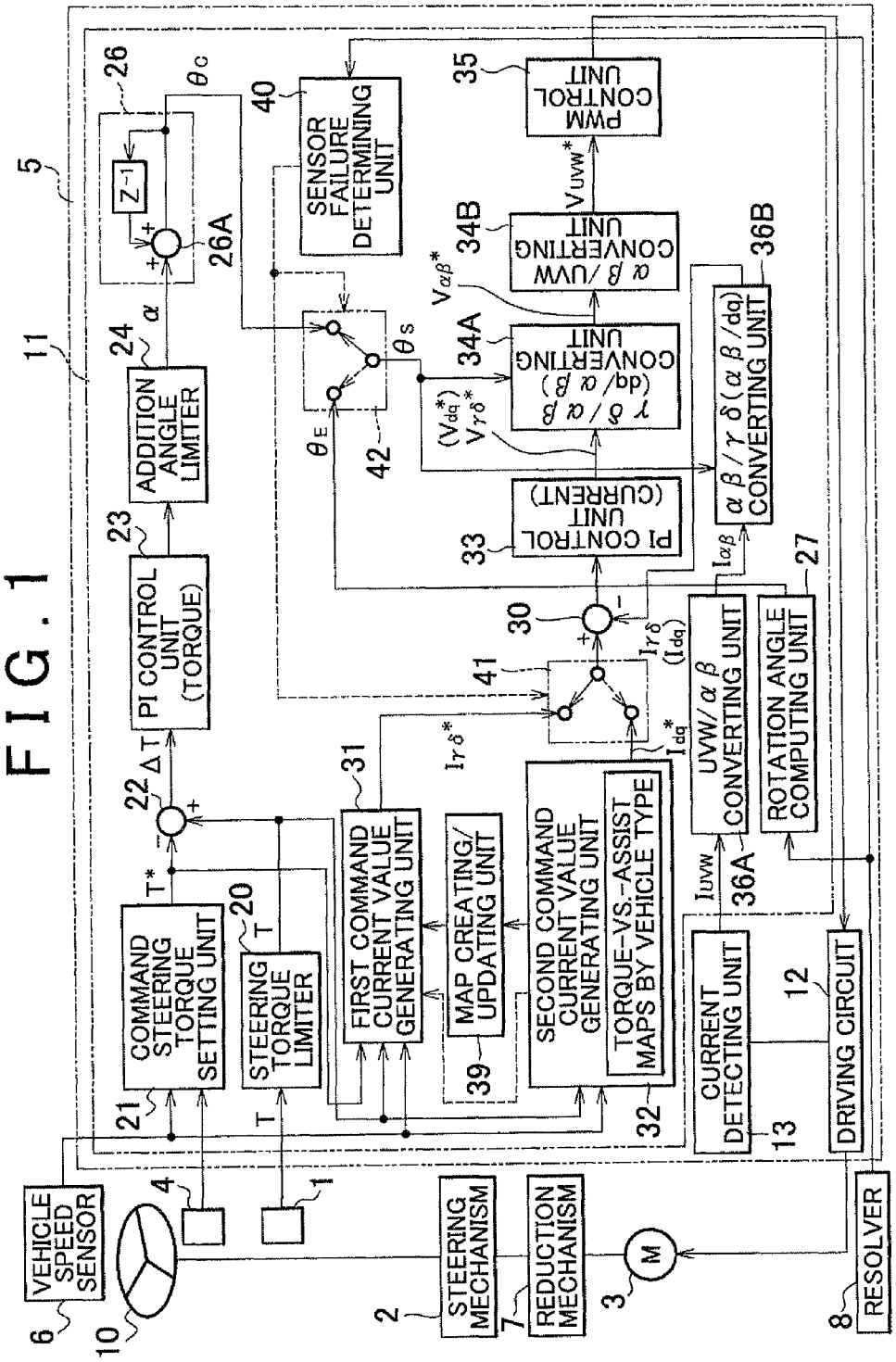
FIG. 1 is a block diagram for illustrating the electrical configuration of an electric power steering system to which a motor control device according to an embodiment of the invention is applied.

Hereinafter, an embodiment of the invention will be described in detail with reference to the accompanying drawings. FIG. 1 is a block diagram for illustrating the electrical configuration of an electric power steering system to which a vehicle steering system according to the embodiment of the invention is applied. The electric power steering system includes a torque sensor 1, a motor 3 (brushless motor), a steering angle sensor 4, a resolver 8 (rotation angle sensor), a motor control device 5 and a vehicle speed sensor 6. The torque sensor 1 detects a steering torque T applied to a steering wheel 10 that serves as an operating member for steering a vehicle. The motor 3 applies steering assist force to a steering mechanism 2 of the vehicle via a reduction mechanism 7. The steering angle sensor 4 detects a steering angle that is the rotation angle of the steering wheel 10. The resolver 8 detects the rotation angle of a rotor in the motor 3. The motor control device 5 carries out drive control over the motor 3. The vehicle speed sensor 6 detects the speed of the vehicle equipped with the electric power steering system. The resolver 8 generates a sine-wave signal and a cosine-wave signal that correspond to a rotor rotation angle (rotor rotation position).

The motor control device 5 drives the motor 3 based on a signal output from the resolver 8, a steering torque detected by the torque sensor 1, a steering angle detected by the steering angle sensor 4 and a vehicle speed detected by the vehicle speed sensor 6 to thereby achieve appropriate steering assistance for a steering condition and a vehicle speed. In this embodiment, the motor 3 is a three-phase brushless motor. As diagrammatically shown in FIG. 2, the motor 3 includes a rotor 50 and U-phase, V-phase and W-phase stator coils 51, 52 and 53. The rotor 50 serves as a field magnet. The stator coils 51, 52 and 53 are arranged in a stator 55 that faces the rotor 50. The motor 3 may be of an inner rotor type in which the stator is arranged on the outer side of the rotor so as to face the rotor, or may be of an outer rotor type in which the stator is arranged on the inner side of the cylindrical rotor so as to face the rotor.

A three-phase fixed coordinate system (UVW coordinate system) is defined such that a U axis, a V axis and a W axis are set in the directions of the stator coils 51, 52 and 53 of the respective phases. In addition, a two-phase rotation coordinate system (dq coordinate system, actual rotation coordinate system) is defined such that a d axis (magnetic pole axis) is set in the direction of the magnetic pole of the rotor 50 and a q axis (torque axis) is set in the direction perpendicular to the d axis within the rotation plane of the rotor 50. The dq coordinate system is a rotation coordinate system that rotates with the rotor 50. In the dq coordinate system, only q-axis current contributes to generation of torque by the rotor 50, so the d-axis current is set to zero and the q-axis current is controlled based on a desired torque. The rotation angle (rotor angle) $\theta_M$ of the rotor 50 is the rotation angle of the d axis with respect to the U axis. The dq coordinate system is an actual rotation coordinate system that rotates in accordance with the rotor angle $\theta_M$. By using the rotor angle $\theta_M$, it is possible to convert coordinates between the UVW coordinate system and the dq coordinate system.

On the other hand, in the embodiment, a control angle $\theta_C$ that indicates a rotation angle used in control is introduced. The control angle $\theta_C$ is an imaginary rotation angle with respect to the U axis. An imaginary two-phase rotation coordinate system (γδ coordinate system, imaginary rotation coordinate system) is defined such that an imaginary axis corresponding to the control angle $\theta_C$ is set as a γ axis and an axis advanced 90° from the γ axis is set as a δ axis. When the control angle $\theta_C$ is equal to the rotor angle $\theta_M$, the γδ coordinate system that is the imaginary rotation coordinate system coincides with the dq coordinate system that is the actual rotation coordinate system. That is, the γ axis that is the imaginary axis coincides with the d axis that is the real axis, and the δ axis that is the imaginary axis coincides with the q axis that is the real axis. The γδ coordinate system is an imaginary rotation coordinate system that rotates in accordance with the control angle $\theta_C$. Coordinates may be converted between the UVW coordinate system and the γδ coordinate system using the control angle $\theta_C$.

The difference between the control angle $\theta_C$ and the rotor angle $\theta_M$ is defined as a load angle $\theta_L$ ($=\theta_C - \theta_M$). When a γ-axis current $I_\gamma$ is supplied to the motor 3 in accordance with the control angle $\theta_C$, the q-axis component (the orthogonal projection to the q axis) of the γ-axis current $I_\gamma$ becomes a q-axis current $I_q$ that contributes to generation of torque by the rotor 50. That is, the relationship expressed by the following mathematical expression 1 is established between the γ-axis current $I_\gamma$ and the q-axis current $I_q$.

$$I_q = I_\gamma \cdot \sin \theta_L \qquad \text{Mathematical Expression 1}$$

FIG. 1 is referred to again. The motor control device 5 includes a microcomputer 11, a driving circuit (inverter circuit) 12 and a current detecting unit 13. The driving circuit 12 is controlled by the microcomputer 11, and supplies electric power to the motor 3. The current detecting unit 13 detects a current flowing through the stator coil of each phase of the motor 3.

The current detecting unit 13 detects phase currents $I_U$, $I_V$ and $I_W$ (hereinafter, referred to as "three-phase detection currents $I_{UVW}$" when they are collectively termed) flowing through the stator coils 51, 52 and 53 of the respective phases of the motor 3. These are current values in the respective coordinate axis directions in the UVW coordinate system. The microcomputer 11 includes a CPU and a memory (a ROM, a RAM, and the like). The microcomputer 11 executes predetermined programs to function as a plurality of function processing units. The plurality of function processing units include a steering torque limiter 20, a command steering torque setting unit 21, a torque deviation computing unit 22, a proportional integral (PI) control unit 23, an addition angle limiter 24, a control angle computing unit 26, a rotation angle computing unit 27, a first command current value generating unit 31, a second command current value generating unit 32, a current deviation computing unit 30, a PI control unit 33, a γδ/αβ (dq/αβ) converting unit 34A, an αβ/UVW converting unit 34B, a pulse width modulation (PWM) control unit 35, a UVW/αβ converting unit 36A, an αβ/γδ (αβ/dq) converting unit 36B, a map creating/updating unit 39, a sensor failure determining unit 40, a command current value change unit 41, an angle change unit 42, and the like.

Figure 4:
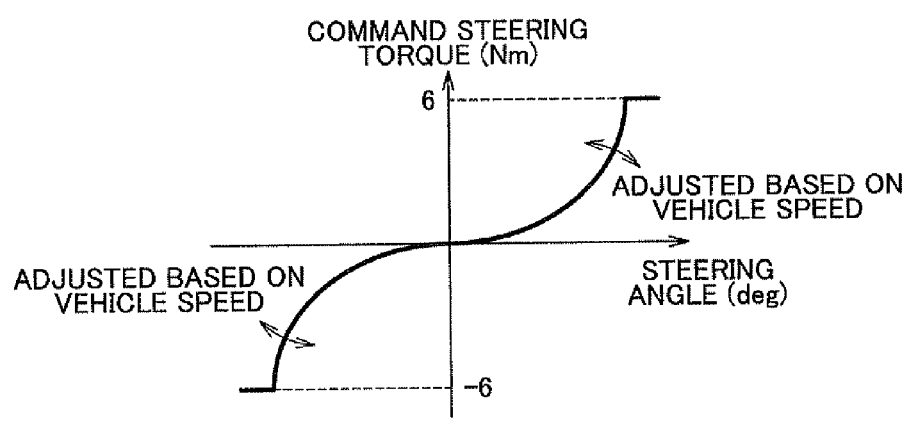
FIG. 4 is a graph that shows an example of the characteristic of a command steering torque with respect to a steering angle.

The command steering torque setting unit 21 sets a command steering torque T* based on the steering angle detected by the steering angle sensor 4 and the vehicle speed detected by the vehicle speed sensor 6. For example, as shown in FIG. 4, when the steering angle is a positive value (state in which the steering wheel 10 is steered in the clockwise direction), the command steering torque T* is set to a positive value (torque applied in the clockwise direction); when the steering angle is a negative value (state in which the steering wheel 10 is steered in the counterclockwise direction), the command steering torque T* is set to a negative value (torque applied in the counterclockwise direction). Then, the command steering torque T* is set such that the absolute value of the command steering torque T* increases (increases nonlinearly in the example of FIG. 4) as the absolute value of the steering angle increases. However, the command steering torque T* is set within a range between a predetermined high limit value (positive value, for example, +6 Nm) and a predetermined low limit value (negative value, for example, −6 Nm). In addition, the command steering torque T* is set such that the absolute value of the command steering torque T* reduces as the vehicle speed increases. That is, vehicle speed sensitive control is executed.

Figure 5:
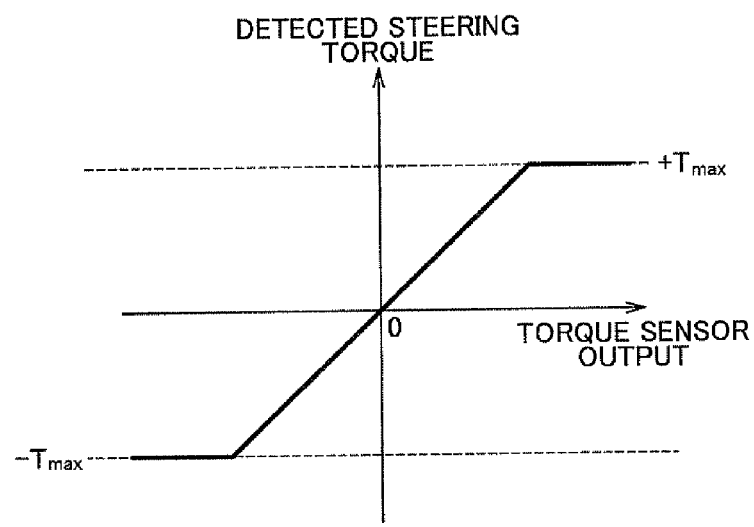
FIG. 5 is a graph for illustrating the function of a steering torque limiter.

The steering torque limiter 20 limits the output from the torque sensor 1 within a range between a predetermined high limit saturation value $+T_{max}$ ($+T_{max}>0$, for example, $+T_{max}=7$ Nm) and a predetermined low limit saturation value $-T_{max}$ ($-T_{max}<0$, for example, $-T_{max}=-7$ Nm). Specifically, as shown in FIG. 5, the steering torque limiter 20 directly outputs a detected steering torque T detected by the torque sensor 1 when the detected steering torque T falls within the range between the high limit saturation value $+T_{max}$ and the low limit saturation value $-T_{max}$. When the detected steering torque T detected by the torque sensor 1 is larger than or equal to the high limit saturation value $+T_{max}$, the steering torque limiter 20 outputs the high limit saturation value $+T_{max}$. When the detected steering torque T detected by the torque sensor 1 is smaller than or equal to the low limit saturation value $-T_{max}$, the steering torque limiter 20 outputs the low limit saturation value $-T_{max}$. The saturation values $+T_{max}$ and $-T_{max}$ define the boundaries of the range in which the signal output from the torque sensor 1 is stable (reliable range). That is, the signal output from the torque sensor 1 is unstable in the range above the high limit saturation value $+T_{max}$ and in the range below the low limit saturation value $-T_{max}$, and does not correspond to an actual steering torque. In other words, the saturation values $+T_{max}$ and $-T_{max}$ are determined based on the output characteristic of the torque sensor 1.

The torque deviation computing unit 22 obtains a deviation (torque deviation) $\Delta T$ ($=T-T^*$) between the command steering torque T* that is set by the command steering torque setting unit 21 and the steering torque T (hereinafter, referred to as "detected steering torque T" for the sake of distinction) that is detected by the torque sensor 1 and then subjected to a limiting process executed by the steering torque limiter 20. The PI control unit 23 performs PI computation on the torque deviation $\Delta T$. That is, the torque deviation computing unit 22 and the PI control unit 23 constitute a torque feedback control device that brings the detected steering torque T to the command steering torque T*. The PI control unit 23 performs PI computation on the torque deviation $\Delta T$ to compute an addition angle $\alpha$ for the control angle $\theta_C$. Thus, the torque feedback control device constitutes an addition angle computing device that computes the addition angle $\alpha$.

The addition angle limiter 24 is an addition angle limiting device that limits the addition angle $\alpha$ obtained by the PI control unit 23. More specifically, the addition angle limiter 24 limits the addition angle $\alpha$ to a value within a range between a predetermined high limit value UL (positive value) and a predetermined low limit value LL (negative value). The high limit value UL and the low limit value LL are determined based on a predetermined limiting value $\omega_{max}$ ($\omega_{max}>0$; for example, the preset value of $\omega_{max}$ is 45 degrees). The preset value of the predetermined limiting value $\omega_{max}$ is determined, for example, based on a maximum steering angular velocity. The maximum steering angular velocity is a maximum value that may be assumed as the steering angular velocity of the steering wheel 10, and is, for example, approximately 800 degrees per second.

The rate of change in the electrical angle of the rotor 50 at the maximum steering angular velocity (angular velocity in electrical angle: maximum rotor angular velocity) is given by the product of the maximum steering angular velocity, the reduction ratio of the reduction mechanism 7 and the number of pole pairs of the rotor 50 as expressed by the following mathematical expression 2. The number of pole pairs is the number of the pairs of magnetic poles (pairs of N pole and S pole) of the rotor 50.

Maximum rotor angular velocity=Maximum steering angular velocity×Reduction ratio×Number of pole pairs    Mathematical Expression 2

The maximum value of the amount of change in the electrical angle of the rotor 50 (rotor angle change amount maximum value) in a computation interval (computation cycle) of the control angle $\theta_C$ is a value obtained by multiplying a maximum rotor angular velocity by a computation cycle as expressed by the following mathematical expression 3.

Rotor angle change amount maximum value=Maximum rotor angular velocity×Computation cycle=Maximum steering angular velocity×Reduction ratio×Number of pole pairs×Computation cycle    Mathematical Expression 3

The rotor angle change amount maximum value is the maximum change amount of the control angle $\theta_C$, allowed in one computation cycle. Then, the rotor angle change amount maximum value may be set as the preset value of the limiting value $\omega_{max}$. The high limit value UL and low limit value LL of the addition angle $\alpha$ are respectively expressed by the following mathematical expressions 4 and 5 using the limiting value $\omega_{max}$.

UL=+$\omega_{max}$    Mathematical Expression 4

LL=−$\omega_{max}$    Mathematical Expression 5

The addition angle $\alpha$ after being subjected to the limiting process executed by the addition angle limiter 24 is added to the immediately preceding value $\theta_C(n-1)$ (n is a number of the present computation cycle) of the control angle $\theta_C$ by an adder 26A of the control angle computing unit 26 ($Z^{-1}$ indicates the immediately preceding value of a signal).

The control angle computing unit 26 includes the adder 26A that adds the addition angle $\alpha$, given from the addition angle limiter 24, to the immediately preceding value $\theta_C(n-1)$ of the control angle $\theta_C$. That is, the control angle computing unit 26 computes the control angle $\theta_C$ in each predetermined computation cycle. Then, the control angle $\theta_C$ in the immediately preceding computation cycle is defined as the immediately preceding value $\theta_C(n-1)$, and the immediately preceding value $\theta_C(n-1)$ is used to obtain a present value $\theta_C(n)$ that is the control angle $\theta_C$ in the current computation cycle. The rotation angle computing unit 27 computes the rotation angle $\theta_E$ of the rotor 50 based on the signal output from the resolver 8. The angle change unit 42 selects one of the control angle $\theta_C$ obtained by the control angle computing unit 26 and the rotor rotation angle $\theta_E$ obtained by the rotation angle computing unit 27, and outputs the selected one as a conversion angle $\theta_S$ for coordinate conversion.

The first command current value generating unit 31 generates values of electric currents that should be supplied to the coordinate axes (imaginary axes) of the $\gamma\delta$ coordinate system that is the imaginary rotation coordinate system corresponding to the control angle $\theta_C$ that is the rotation angle in control, as command current values. Specifically, the first command current value generating unit 31 generates a $\gamma$-axis command current value $I_\gamma^*$ and a $\delta$-axis command current value $I_\delta^*$ (hereinafter, referred to as "two-phase command current values $I_{\gamma\delta}^*$" when they are collectively termed). The first command current value generating unit 31 sets the $\gamma$-axis command current value $I_\gamma^*$ as a significant value; whereas the first command current value generating unit 31 sets the δ-axis command current value $I_δ^*$ to zero. More specifically, the first command current value generating unit 31 sets the γ-axis command current value $I_γ^*$ based on the command steering torque $T^*$ set by the command steering torque setting unit 21, the detected steering torque T detected by the torque sensor 1 and then subjected to the limiting process executed by the steering torque limiter 20, the vehicle speed detected by the vehicle speed sensor 6 and a vehicle speed-vs.-high limit value map created by the map creating/updating unit 39. The details of the first command current value generating unit 31 and map creating/updating unit 39 will be described later.

The second command current value generating unit 32 generates values of electric currents that should be supplied to the coordinate axes of the dq coordinate system, as command current values. Specifically, a d-axis command current value $I_d^*$ and a q-axis command current value $I_q^*$ (hereinafter, referred to as "two-phase command current values $I_{dq}^*$" when they are collectively termed). Furthermore, specifically, the second command current value generating unit 32 sets the q-axis command current value $I_q^*$ as a significant value; whereas the second command current value generating unit 32 sets the d-axis command current value $I_d^*$ to zero. More specifically, the second command current value generating unit 32 sets the q-axis command current value $I_q^*$ based on the detected steering torque T detected by the torque sensor 1 and subjected to the limiting process executed by the steering torque limiter 20, the vehicle speed detected by the vehicle speed sensor 6 and a torque-vs.-assist map that stores an assist characteristic, indicating the correlation of a target assist torque $T_A^*$ with a steering torque T, for each vehicle speed.

The torque-vs.-assist map is created in advance for each vehicle type. Then, the torque-vs.-assist maps by vehicle type are stored in the second command current value generating unit 32. The second command current value generating unit 32 selects the assist characteristic corresponding to the vehicle speed based on the torque-vs.-assist map that corresponds to the vehicle type selected by a user, or the like, from among the torque-vs.-assist maps by vehicle type, and the vehicle speed detected by the vehicle speed sensor 6. Then, the second command current value generating unit 32 obtains a target assist torque $T_A^*$ corresponding to the detected steering torque T based on the detected steering torque T and the assist characteristic corresponding to the vehicle speed. Then, the obtained target assist torque $T_A^*$ is divided by a torque constant $K_T$ of the motor 3 to compute the q-axis command current value $I_q^*$. That is, the q-axis command current value $I_q^*$ is proportional to the target assist torque $T_A^*$.

Figure 6:
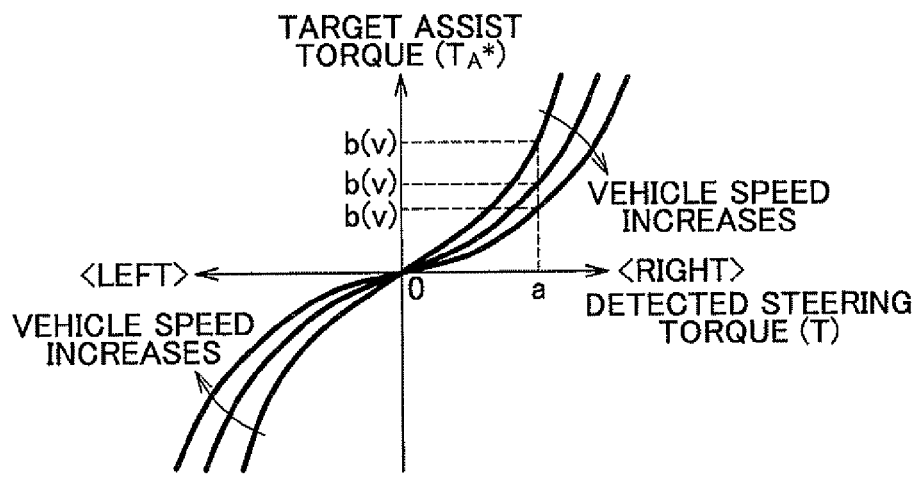
FIG. 6 is a graph that shows an example of the characteristic of a target assist torque with respect to a detected steering torque.

FIG. 6 is a graph that shows an example of the characteristic of a target assist torque $T_A^*$ with respect to a detected steering torque T (hereinafter, referred to as "torque-vs.-assist characteristic"), expressed by the torque-vs.-assist map corresponding to the vehicle type. The detected steering torque T is, for example, set such that a detected steering torque for clockwise steering is a positive value and a detected steering torque for counterclockwise steering is a negative value. In addition, the target assist torque $T_A^*$ is set such that a target assist torque for clockwise steering is a positive value and a target assist torque for counterclockwise steering is a negative value. The target assist torque $T_A^*$ is a positive value when the detected steering torque T is a positive value, whereas the target assist torque $T_A^*$ is a negative value when the detected steering torque T is a negative value.

In the-torque vs.-assist characteristic shown in FIG. 6, the absolute value of the target assist torque $T_A^*$(q-axis command current value $I_q^*$) increases (nonlinearly increases in the example of FIG. 6) as the absolute value of the detected steering torque T increases. In addition, the absolute value of the target assist torque $T_A^*$(q-axis command current value $I_q^*$) reduces as the vehicle speed detected by the vehicle speed sensor 6 increases. Thus, a large steering assist force is generated while the vehicle is traveling at a low speed, and a steering assist force is reduced while the vehicle is traveling at a high speed.

The command current value change unit 41 selects one of the two-phase command current values $I_{γδ}^*$ generated by the first command current value generating unit 31 and the two-phase command current values $I_{dq}^*$ generated by the second command current value generating unit 32, and provides the selected one to the current deviation computing unit 30. The sensor failure determining unit 40 determines whether there is a failure in the resolver 8, and changes the control mode of the motor 3 based on the determined results. For example, the sensor failure determining unit 40 monitors a signal output to a signal line of the resolver 8 to detect a failure of the resolver 8, a disconnection failure of the signal line of the resolver 8 and a grounding failure of the signal line of the resolver 8. The sensor failure determining unit 40 changes the control mode between a first mode and a second mode based on the results of determination as to whether there is a failure in the resolver 8, and generates a mode change command. In response to the mode change command, changing operation is executed in the command current value change unit 41 and the angle change unit 42.

Specifically, when the sensor failure determining unit 40 determines that there is no failure in the resolver 8 (at normal time), the sensor failure determining unit sets the control mode to the second mode. On the other hand, when the sensor failure determining unit 40 determines that there is a failure in the resolver 8 (at failure time), the sensor failure determining unit 40 changes the control mode from the second mode to the first mode. In the second mode, the command current value change unit 41 selects and outputs the two-phase command current values $I_{dq}^*$ generated by the second command current value generating unit 32, and the angle change unit 42 selects and outputs the rotor rotation angle $θ_E$ generated by the rotation angle computing unit 27. In the first mode, the command current value change unit 41 selects and outputs the two-phase command current values $I_{γδ}^*$ generated by the first command current value generating unit 31, and the angle change unit 42 selects and outputs the control angle $θ_C$ generated by the control angle computing unit 26.

The current deviation computing unit 30 computes a deviation of the two-phase detected currents $I_{γδ}$ (γ-axis detected current $I_γ$ and δ-axis detected current $I_δ$) from the command current values $I_{γδ}^*$ selected by the command current value change unit 41, or a deviation of the two-phase detected currents $I_{dq}$ (d-axis detected current $I_d$ and q-axis detected current $I_q$) from the command current values $I_{dq}^*$ selected by the command current value change unit 41. Specifically, when the command current value change unit 41 outputs the two-phase command current values $I_{γδ}^*$, the current deviation computing unit 30 computes the deviation $I_γ^*-I_γ$ of the γ-axis detected current $I_γ$ from the γ-axis command current value $I_γ^*$ and the deviation $I_δ^*-I_δ$ of the δ-axis detected current $I_δ$ from the δ-axis command current value $I_δ^*$ (=0). In addition, when the command current value change unit 41 outputs the two-phase command current values $I_{dq}^*$, the current deviation computing unit 30 computes the deviation $I_d^*-I_d$ of the d-axis detected current $I_d$ from the d-axis command current value $I_d^*$ (=0) and the deviation $I_q^*-I_q$ of the q-axis detected current $I_q$ from the q-axis command current value $I_q^*$. The γ-axis detected current $I_γ$ and the δ-axis detected current $I_δ$ or the d-axis detected current $I_d$ and the q-axis detected current $I_q$ are given from the αβ/γδ (αβ/dq) converting unit 36B to the deviation computing unit 30.

Figure 2:
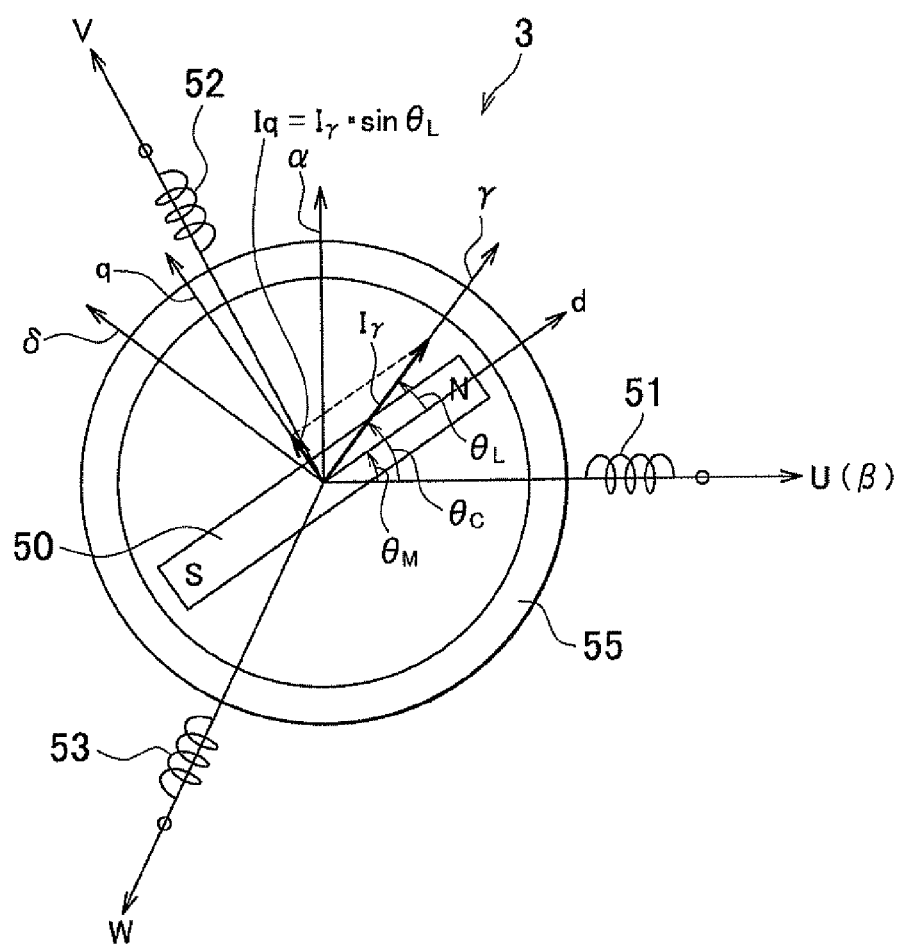
FIG. 2 is a diagram for illustrating the configuration of a motor.

The UVW/αβ converting unit 36A converts three-phase detected currents $I_{UVW}$ (U-phase detected current $I_U$, V-phase detected current $I_V$ and W-phase detected current $I_W$) on the UVW coordinate system, detected by the current detecting unit 13, to two-phase detected currents $I_α$ and $I_β$ (hereinafter, referred to as "two-phase detected currents $I_{αβ}$" when they are collectively termed) on the αβ coordinate system that is a two-phase fixed coordinate system. As shown in FIG. 2, the αβ coordinate system is a fixed coordinate system in which the rotation center of the rotor 50 is set as an origin and an α axis and a β axis (that coincides with the U axis in the example of FIG. 2) perpendicular to the α axis are set in the rotation plane of the rotor 50. When the control mode is the first mode, the αβ/γδ (αβ/dq) converting unit 36B converts the two-phase detected currents $I_{αβ}$ to two-phase detected currents $I_γ$ and $I_δ$ (hereinafter, referred to as "two-phase detected currents $I_{γδ}$" when they are collectively termed) on the γδ coordinate system. On the other hand, when the control mode is the second mode, the αβ/γδ (αβ/dq) converting unit 36B converts the two-phase detected currents $I_{αβ}$ to two-phase detected currents $I_d$ and $I_q$ (hereinafter, referred to as "two-phase detected currents $I_{dq}$" when they are collectively termed) on the dq coordinate system. These are given to the current deviation computing unit 30. Coordinate conversion in the αβ/γδ (αβ/dq) converting unit 36B uses the conversion angle $θ_S$ selected by the angle change unit 42.

The PI control unit 33 performs PI computation on the current deviation computed by the current deviation computing unit 30 to generate two-phase command voltage values $V_{γδ}^*$ (γ-axis command voltage value $V_γ^*$ and δ-axis command voltage value $V_δ^*$) or two-phase command voltage values $V_{dq}^*$ (d-axis command voltage value $V_d^*$ and q-axis command voltage value $V_q^*$) that should be applied to the motor 3. Specifically, when the control mode is the first mode, the PI control unit 33 generates the two-phase command voltage values $V_{γδ}^*$; whereas, when the control mode is the second mode, the PI control unit 33 generates the two-phase command voltage values $V_{dq}^*$. The two-phase command voltage values $V_{γδ}^*$ or $V_{dq}^*$ generated by the PI control unit 33 are given to the γδ/αβ (dq/αβ) converting unit 34A.

When the control mode is the first mode, the γδ/αβ (dq/αβ) converting unit 34A converts the two-phase command voltage values $V_{γδ}^*$ to two-phase command voltage values $V_{αβ}^*$ on the αβ coordinate system; whereas, when the control mode is the second mode, the γδ/αβ (dq/αβ) converting unit 34A converts the two-phase command voltage values $V_{dq}^*$ to two-phase command voltage values $V_{αβ}^*$ on the αβ coordinate system. This coordinate conversion uses the conversion angle $θ_S$ selected by the angle change unit 42. The two-phase command voltage values $V_{αβ}^*$ are formed of an α-axis command voltage value $V_α^*$ and a β-axis command voltage value $V_β^*$. The αβ/UVW converting unit 34B performs coordinate conversion on the two-phase command voltage values $V_{αβ}^*$ to generate three-phase command voltage values $V_{UVW}^*$. The three-phase command voltage values $V_{UVW}^*$ are formed of a U-phase command voltage value $V_U^*$, a V-phase command voltage value $V_V^*$ and a W-phase command voltage value $V_W^*$. The three-phase command voltage values $V_{UVW}^*$ are given to the PWM control unit 35.

The PWM control unit 35 generates a U-phase PWM control signal, a V-phase PWM control signal and a W-phase PWM control signal respectively having duty ratios corresponding to the U-phase command voltage value $V_U^*$, the V-phase command voltage value $V_V^*$ and the W-phase command voltage value $V_W^*$, and provides the control signals to the driving circuit 12. The driving circuit 12 is formed of a three-phase inverter circuit having a U phase, a V phase and a W phase. Power elements that constitute the inverter circuit are controlled by the PWM control signals given from the PWM control unit 35, and therefore voltages corresponding to the three-phase command voltage values $V_{UVW}^*$ are applied to the stator coils 51, 52 and 53 of the respective phases of the motor 3.

Figure 3:
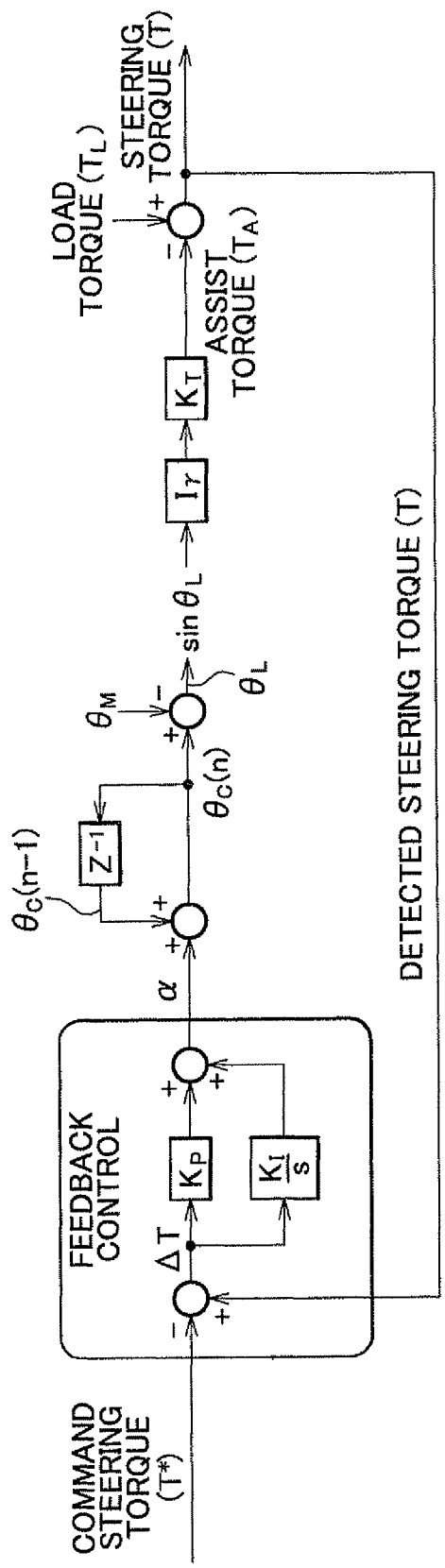
FIG. 3 is a control block diagram of the electric power steering system.

The current deviation computing unit 30 and the PI control unit 33 constitute a current feedback control device. Owing to the function of the current feedback control device, motor current supplied to the motor 3 is controlled so as to approach the two-phase command current values $I_{γδ}^*$ or two-phase command current values $I_{dq}^*$, selected by the command current value change unit 41. FIG. 3 is a control block diagram of the electric power steering system in the first mode. However, for the sake of easy description, the function of the addition angle limiter 24 is omitted.

An addition angle α is generated through PI control over the deviation (torque deviation) ΔT between the command steering torque T* and the detected steering torque T ($K_P$ is a proportionality coefficient, $K_1$ is an integral coefficient and 1/s is an integral operator). The addition angle α is added to the immediately preceding value $θ_C(n-1)$ of the control angle $θ_C$ to thereby obtain the present value $θ_C(n)$ (=$θ_C(n-1)+α$) of the control angle $θ_C$. At this time, the deviation between the control angle $θ_C$ and the actual rotor angle $θ_M$ of the rotor 50 becomes a load angle $θ_L$ (=$θ_C-θ_M$).

Thus, when the γ-axis current $I_γ$ is supplied in accordance with the γ-axis command current value $I_γ^*$ to the γ axis (imaginary axis) of the γδ coordinate system (imaginary rotation coordinate system) according to the control angle $θ_C$, the q-axis current $I_q$ is equal to $I_γ \sin θ_L$. The q-axis current $I_q$ contributes to generation of torque by the rotor 50. That is, a value obtained by multiplying the torque constant $K_T$ of the motor 3 by the q-axis current $I_q$ (=$I_γ \sin θ_L$) is transmitted to the steering mechanism 2 through the reduction mechanism 7 as an assist torque $T_A$ (=$K_T·I_γ \sin θ_L$). A value obtained by subtracting the assist torque $T_A$ from the load torque $T_L$ applied from the steering mechanism 2 is a steering torque T that should be given by a driver to the steering wheel 10. Through feedback of the steering torque T, the system operates so as to bring the steering torque T to the command steering torque T*. That is, in order to bring the detected steering torque T into coincidence with the command steering torque T*, the addition angle α is obtained and then the control angle $θ_C$ is controlled based on the addition angle α.

In this way, current is supplied to the γ axis that is the imaginary axis in control, while the control angle $θ_C$ is updated using the addition angle α obtained based on the deviation ΔT between the command steering torque T* and the detected steering torque T. Thus, the load angle $θ_L$ changes, and a torque based on the load angle $θ_L$ is generated from the motor 3. Thus, a torque corresponding to the command steering torque T* set based on a steering angle and a vehicle speed is generated from the motor 3, so an appropriate steering assist force corresponding to the steering angle and the vehicle speed is given to the steering mechanism 2. That is, steering assist control is executed such that the steering torque increases as the absolute value of the steering angle increases and the steering torque reduces as the vehicle speed increases.

In this way, in the first mode, the motor 3 is appropriately controlled without using the rotation angle sensor to thereby make it possible to carry out appropriate steering assistance. On the other hand, in the second mode, the two-phase command current values $I_{dq}*$ based on a detected steering torque T and a vehicle speed are set, and current flowing through the motor 3 is subjected to feedback control so as to converge to the two-phase command current values $I_{dq}*$. Then, the rotation angle $\theta_E$ of the rotor 50 is obtained based on the signal output from the resolver 8, and coordinate conversion is performed in the $\gamma\delta/\alpha\beta$ (dq/$\alpha\beta$) converting unit 34A and the $\alpha\beta/\gamma\delta$ ($\alpha\beta$/dq) converting unit 36B, using the rotation angle $\theta_E$. That is, in the second mode, the motor 3 is controlled using the resolver 8 that is the rotation angle sensor to thereby carry out appropriate steering assistance.

A first control device (load angle control device) is formed of components enabled in the first mode, and a second control device is formed of components enabled in the second mode. The first control device is formed of the command steering torque setting unit 21, the steering torque limiter 20, the torque deviation computing unit 22, the PI control unit 23, the addition angle limiter 24, the control angle computing unit 26, the first command current value generating unit 31, the current deviation computing unit 30, the PI control unit 33, the $\gamma\delta/\alpha\beta$ (dq/$\alpha\beta$) converting unit 34A, the $\alpha\beta$/UVW converting unit 34B, the PWM control unit 35, the UVW/$\alpha\beta$ converting unit 36A, the $\alpha\beta/\gamma$ ($\alpha\beta$/dq) converting unit 36B and the map creating/updating unit 39. In addition, the second control device is formed of the rotation angle computing unit 27, the steering torque limiter 20, the second command current value generating unit 32, the current deviation computing unit 30, the PI control unit 33, the $\gamma\delta/\alpha\beta$ (dq/$\alpha\beta$) converting unit 34A, the $\alpha\beta$/UVW converting unit 34B, the PWM control unit 35, the UVW/$\alpha\beta$ converting unit 36A and the $\alpha\beta/\gamma\delta$ ($\alpha\beta$/dq) converting unit 36B. That is, the first and second control devices share the steering torque limiter 20, the current deviation computing unit 30, the PI control unit 33, the $\gamma\delta/\alpha\beta$ (dq/$\alpha\beta$) converting unit 34A, the $\alpha\beta$/UVW converting unit 34B, the PWM control unit 35, the UVW/$\alpha\beta$ converting unit 36A and the $\alpha\beta/\gamma\delta$ ($\alpha\beta$/dq) converting unit 36B.

Figure 7:
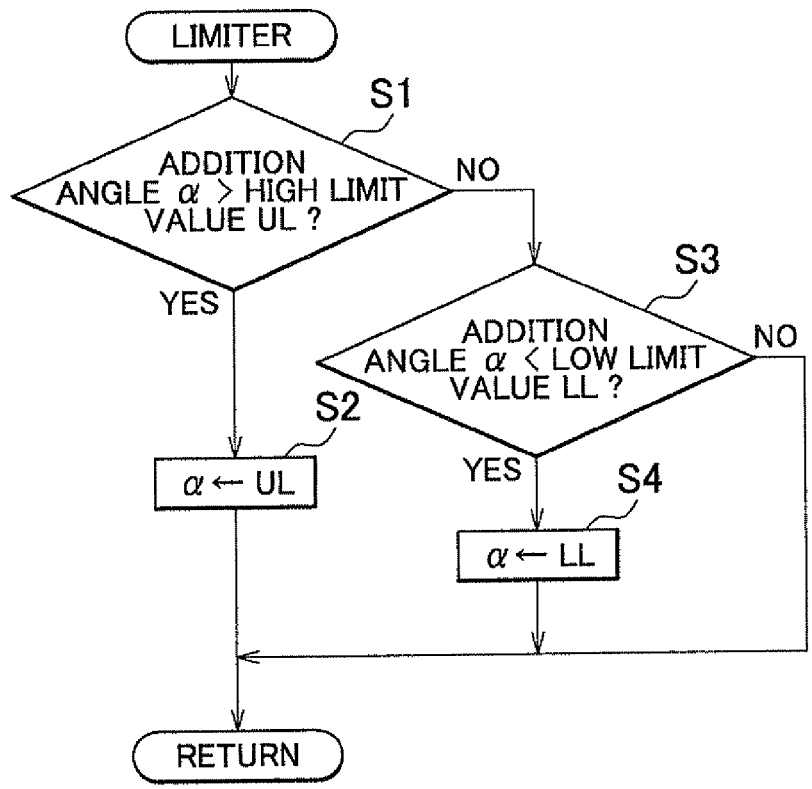
FIG. 7 is a flowchart for illustrating the function of an addition angle limiter.

FIG. 7 is a flowchart for illustrating the function of the addition angle limiter 24. The addition angle limiter 24 compares the addition angle $\alpha$ obtained by the PI control unit 23 with the high limit value UL (step S1). When the addition angle $\alpha$ exceeds the high limit value UL (YES in step S1), the high limit value UL is substituted for the addition angle $\alpha$ (step S2). Thus, the high limit value UL (=+$\omega_{max}$) is added to the control angle $\theta_C$.

When the addition angle $\alpha$ obtained by the PI control unit 23 is smaller than or equal to the high limit value UL (NO in step S1), the addition angle limiter 24 further compares the addition angle $\alpha$ with the low limit value LL (step S3). Then, when the addition angle $\alpha$ is smaller than the low limit value (YES in step S3), the low limit value LL is substituted for the addition angle $\alpha$ (step S4). Thus, the low limit value LL (=−$\omega_{max}$) is added to the control angle $\theta_C$.

When the addition angle $\alpha$ obtained by the PI control unit 23 is larger than or equal to the low limit value LL and is smaller than or equal to the high limit value UL (NO in step S3), the addition angle $\alpha$ is added to the control angle $\theta_C$ without limitation. In this way, the addition angle $\alpha$ is limited to a value within the range between the high limit value UL and the low limit value LL, so it is possible to stabilize control. More specifically, even when an unstable control state (state where assist force is unstable) occurs at the time of shortage of current or at the time of the start of control, it is possible to facilitate shift from this state to a stable control state.

Hereinafter, the map creating/updating unit 39 and the first command current value generating unit 31 will be described in detail. When the torque-vs.-assist map corresponding to the vehicle type is selected by a user, or the like, from among the torque-vs.-assist maps by vehicle type, stored in the second command current value generating unit 32, the map creating/updating unit 39 creates a vehicle speed-vs.-high limit value map that stores the correlation of a high limit value of the $\gamma$-axis command current value $I_\gamma*$ with a vehicle speed based on the selected torque-vs.-assist map. The created vehicle speed-vs.-high limit value map is given to the first command current value generating unit 31, and is stored in the first command current value generating unit 31.

In addition, when the currently selected torque-vs.-assist map is changed, the map creating/updating unit 39 creates a vehicle speed-vs.-high limit value map that stores the correlation of a high limit value of the $\gamma$-axis command current value $I_\gamma*$ with a vehicle speed based on the changed torque-vs.-assist map. Then, the vehicle speed-vs.-high limit value map stored in the first command current value generating unit 31 is updated based on the created vehicle speed-vs.-high limit value map.

Figure 8:
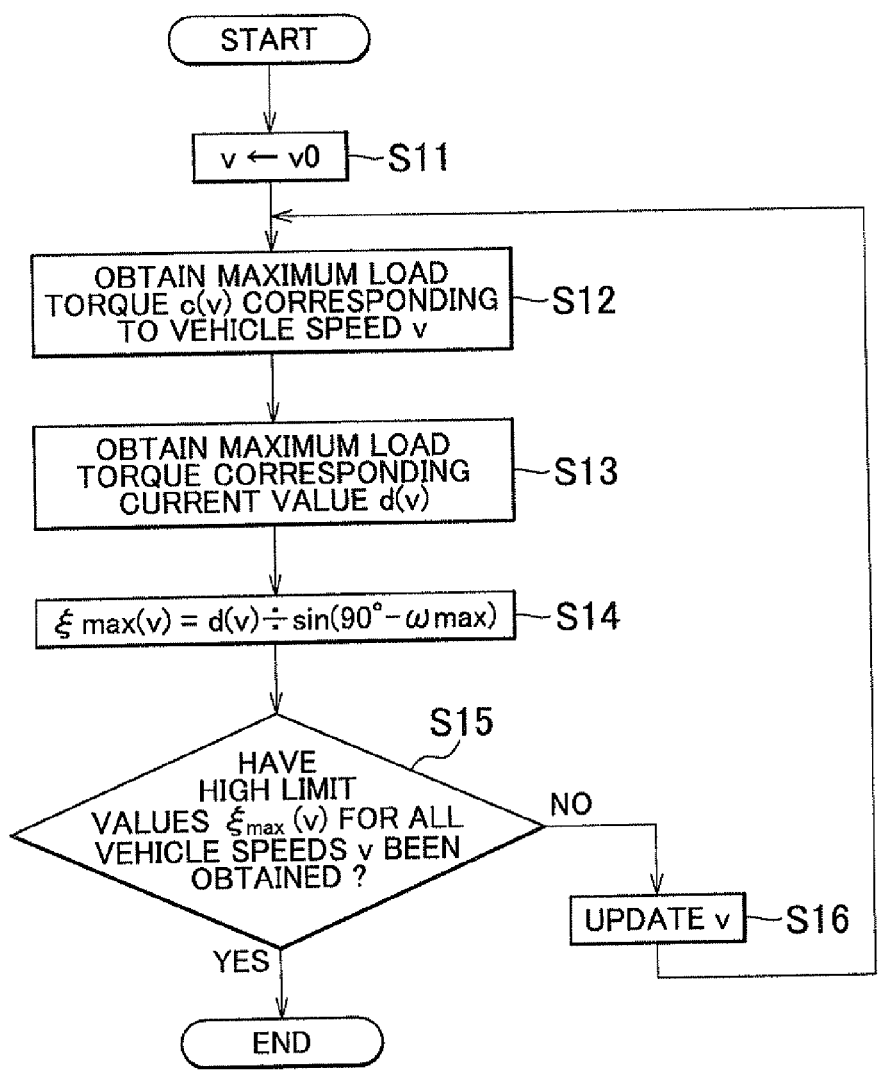
FIG. 8 is a flowchart that shows the procedure of the process of creating a vehicle speed-vs.-high limit value map using a map creating/updating unit.

FIG. 8 is a flowchart that shows the procedure of the process of creating a vehicle speed-vs.-high limit value map by the map creating/updating unit 39. The torque-vs.-assist map based on which a vehicle speed-vs.-high limit value map is created is a torque-vs.-assist map that corresponds to the torque-vs.-assist characteristic shown in FIG. 6. The map creating/updating unit 39 first sets a variable v that indicates a vehicle speed to one vehicle speed v0 from among a plurality of vehicle speeds (step S11). Then, a maximum load torque c(v) corresponding to the vehicle speed (in the illustration of FIG. 8, it is assumed to be "vehicle speed v") indicated by the variable v is obtained based on the torque-vs.-assist characteristic expressed by the vehicle speed-vs.-high limit value map based on which the vehicle speed-vs.-high limit value map is created (step S12). As shown in FIG. 6, the maximum load torque c(v) corresponding to the vehicle speed v is obtained by computing the sum of a predetermined steering torque a and a target assist torque b(v) corresponding to the predetermined steering torque a in the torque-vs.-assist characteristic corresponding to the vehicle speed v. That is, c(v)=a+b(v). Here, the predetermined steering torque a is, for example, set to a predetermined value that is larger than or equal to 5 Nm (for example, 6 Nm). Note that the maximum load torque c(v) for each vehicle speed reduces as the vehicle speed v increases.

Subsequently, the map creating/updating unit 39 uses the maximum load torque c(v) corresponding to the vehicle speed v obtained in step S12 and the torque constant $K_T$ of the motor 3 to obtain a $\gamma$-axis current value for causing the motor 3 to generate the maximum load torque c(v) corresponding to the vehicle speed v (hereinafter, referred to as "maximum load torque corresponding current value d(v)") based on the following mathematical expression 6 (step S13).

$$d(v)=c(v)/K_T \qquad \text{Mathematical Expression 6}$$

After that, the map creating/updating unit 39 uses the maximum load torque corresponding current value d(v) corresponding to the vehicle speed v obtained in step S13 and the limiting value $\omega_{max}$ of the addition angle limiter 24 to obtain a high limit value $\xi_{max}(v)$ corresponding to the vehicle speed v (a high limit value of the $\gamma$-axis command current value $I_\gamma*$) based on the following mathematical expression 7 (step S14).

$$\xi_{max}(v)=d(v)/\sin(90°-\omega_{max}) \qquad \text{Mathematical Expression 7}$$

Figure 9:
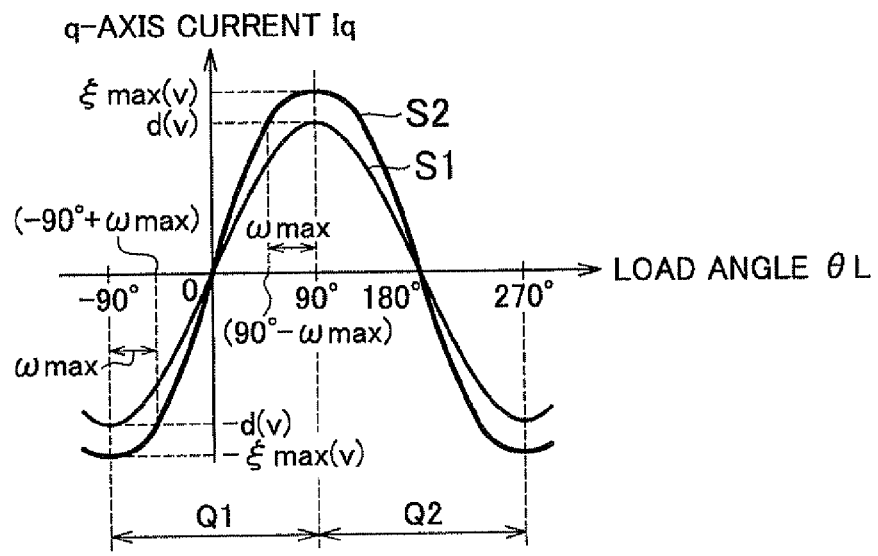
FIG. 9 is a graph for illustrating the process of creating the vehicle speed-vs.-high limit value map.

The reason why the high limit value $\xi_{max}(v)$ is obtained based on the mathematical expression 7 will be described. The curve S1 of FIG. 9 expresses the correlation between a load angle $\theta_L$ and a q-axis current $I_q$ when the $\gamma$-axis current $I_\gamma$ is a maximum load torque corresponding current value d(v). As is described with reference to FIG. 2, the q-axis current $I_q$ is given by $I_q=I_\gamma \sin\theta_L$ ($\theta_L=\theta_C-\theta_M$) using the load angle $\theta_L$ and the γ-axis current $I_\gamma$. Thus, a change in the q-axis current $I_q$ with respect to the load angle $\theta_L$, when the γ-axis current $I_\gamma$ is a maximum load torque corresponding current value d(v), becomes a curve (sine curve) expressed by S1 shown in FIG. 9. Note that the assist torque $T_A$ is a value obtained by multiplying the torque constant $K_T$ of the motor 3 by the q-axis current $I_q$. Thus, a change in the assist torque $T_A$ with respect to the load angle $\theta_L$ also becomes a sine curve similar to the curve S1.

The q-axis current $I_q$ (assist torque $T_A$) monotonously increases in a section Q1 where $-90°\leq\theta_L\leq 90°$, and monotonously reduces in a section Q2 where $90°<\theta_L<270°$. In this embodiment, the addition angle α is controlled such that the load angle $\theta_L$ is adjusted within a range of the section Q1 where the correlation between the load angle $\theta_L$ and the assist torque (motor torque) is a positive correlation. In the case where the γ-axis current $I_\gamma$ is a maximum load torque corresponding current value d(v) (in the case where a change in the q-axis current $I_q$ with respect to the load angle $\theta_L$ is expressed by the curve S1), when the load angle $\theta_L$ exceeds 90°, it takes much time until the assist torque converges to an appropriate value. Then, in this embodiment, the load angle $\theta_L$ is controlled within a range in which the load angle $\theta_L$ does not exceed 90°. That is, the high limit value $\xi_{max}(v)$ of the γ-axis current $I_\gamma$ is determined such that the q-axis current $I_q$ becomes the maximum load torque corresponding current value d(v) when the load angle $\theta_L$ is ($90°-\omega_{max}$). Specifically, the high limit value $\xi_{max}(v)$ of the γ-axis current $I_\gamma$ is determined such that a change in the q-axis current $I_q$ with respect to the load angle $\theta_L$ becomes a curve expressed by S2 in FIG. 9.

For this purpose, the high limit value $\xi_{max}$ of the γ-axis current $I_\gamma$ needs to be determined such that the following mathematical expression 8 is satisfied.

$$d(v)=\xi_{max}(v)\times\sin(90°-\omega_{max}) \quad \text{Mathematical Expression 8}$$

The above mathematical expression 7 is obtained by modifying this mathematical expression 8. If the high limit value $\xi_{max}(v)$ is determined in this way, when the γ-axis current $I_\gamma$ is the high limit value $\xi_{max}(v)$, the assist torque $T_A$ corresponding to the maximum load torque is generated from the motor 3 when the load angle $\theta_L$ is ($-90°+\omega_{max}$) that is larger by $\omega_{max}$ than $-90°$, or ($90°-\omega_{max}$) that is smaller by $\omega_{max}$ than 90°. Thus, in principle, the load angle $\theta_L$ is controlled within a range where $(-90°+\omega_{max})\leq\theta_L\leq(90°-\omega_{max})$. Then, in the case where the load angle $\theta_L$ falls within this range, even when the load angle $\theta_L$ is changed by the limiting value $\omega_{max}$ of the addition angle limiter 24 (maximum value of the addition angle α) due to shortage of assist torque, the load angle $\theta_L$ falls within the range where $-90°\leq\theta_L\leq 90°$. Therefore, the load angle $\theta_L$ may be controlled within a desirable range.

Note that, when the addition angle α is controlled such that the load angle $\theta_L$ is adjusted within a range of the section Q2 where the load angle $\theta_L$ and the assist torque (motor torque) have a negative correlation, it takes much time until the assist torque converges to an appropriate value when the load angle $\theta_L$ exceeds 270°. Then, the high limit value $\xi_{max}$ of the γ-axis current $I_\gamma$ is determined such that the following mathematical expression 9 is satisfied.

$$-d(v)=\xi_{max}(v)\times\sin(270°-\omega_{max}) \quad \text{Mathematical Expression 9}$$

The mathematical expression 8 may be obtained by modifying the above mathematical expression 9. Thus, in this case as well, it is possible to obtain the high limit value $\xi_{max}(v)$ corresponding to the vehicle speed v based on the mathematical expression 7.

Referring again to FIG. 8, in step S14, when the high limit value $\xi_{max}(v)$ corresponding to the vehicle speed v is obtained, the map creating/updating unit 39 determines whether the high limit values $\xi_{max}(v)$ for all the vehicle speeds v have been obtained (step S15). When the high limit values $\xi_{max}(v)$ for all the vehicle speeds v have not been obtained (NO in step S15), the vehicle speed v is updated to a vehicle speed that has not yet selected (step S16), and then the process returns to step S12. Then, the processes of steps S12 to S14 are executed again to thereby obtain the high limit value $\xi_{max}(v)$ corresponding to the updated vehicle speed v.

Figure 10:
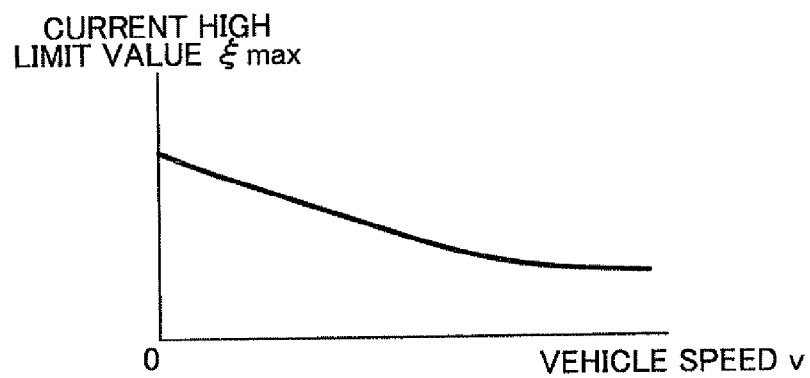
FIG. 10 is a graph that shows an example of a vehicle speed-vs.-high limit value characteristic.

By repeating such processes, the high limit values $\xi_{max}(v)$ for all the vehicle speeds v are obtained. That is, the vehicle speed-vs.-high limit value map is created. In this way, when the vehicle speed-vs.-high limit value map is created, affirmative determination is made in step S15, so the current process of creating the vehicle speed-vs.-high limit value map ends. FIG. 10 shows an example of the characteristic of a high limit value $\xi_{max}$ with respect to a vehicle speed (hereinafter, referred to as "vehicle speed-vs.-high limit value characteristic") expressed by the vehicle speed-vs.-high limit value map. In the vehicle speed-vs.-high limit value characteristic shown in FIG. 10, the high limit value $\xi_{max}$ reduces (nonlinearly reduces in the example of FIG. 10) as the vehicle speed increases.

Figure 11:
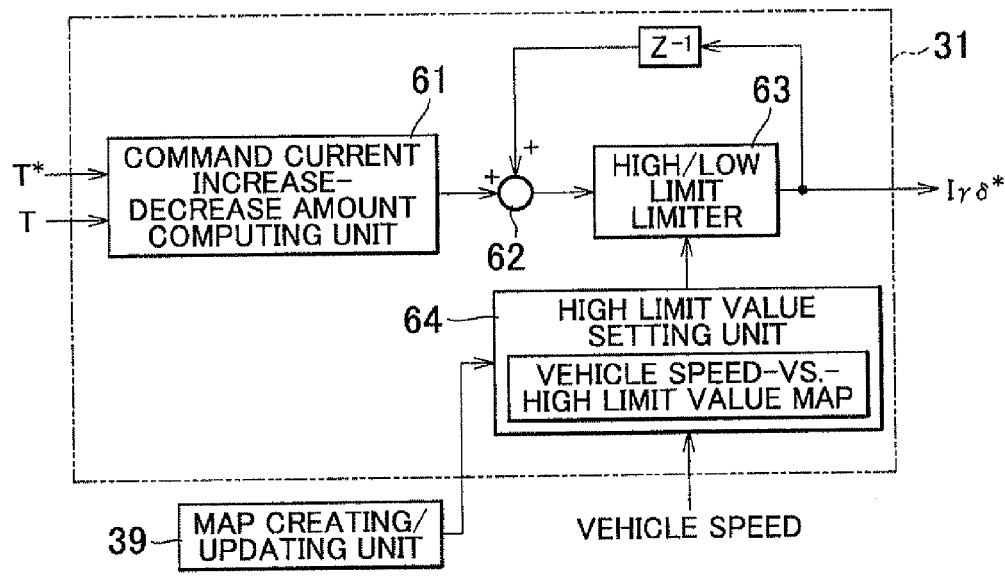
FIG. 11 is a block diagram that shows the configuration of a first command current value generating unit.

FIG. 11 is a block diagram that shows the configuration of the first command current value generating unit 31. The first command current value generating unit 31 includes a command current increase-decrease amount computing unit 61, an adder 62, a high/low limit limiter 63 and a high limit value setting unit 64. The command current increase-decrease amount computing unit 61 computes a current increase-decrease amount $\Delta I_\gamma^*$ with respect to a command current value $I_\gamma^*$ based on the command steering torque T* and the detected steering torque T in each predetermined computation cycle. Specifically, the command current increase-decrease amount computing unit 61 computes a current increase-decrease amount $\Delta I_\gamma^*$ based on the sign of the command steering torque T* and the deviation $\Delta T$ (=T−T*) between the command steering torque T* and the detected steering torque T.

Figure 12A:
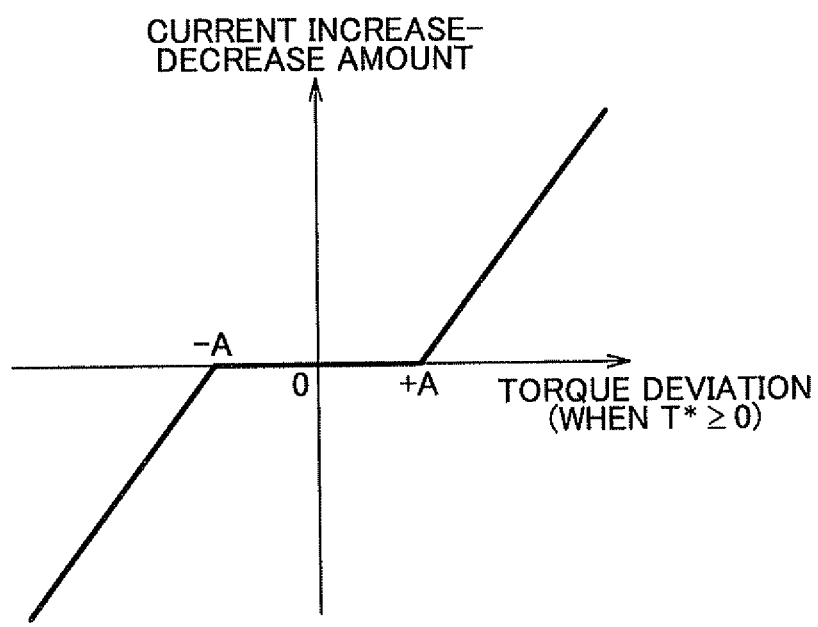
FIG. 12A is a graph that shows an example of setting a current increase-decrease amount with respect to a torque deviation in the case where the sign of a command steering torque is positive.

An example of setting a current increase-decrease amount $\Delta I_\gamma^*$ with respect to a torque deviation $\Delta T$, when the sign of the command steering torque T* is positive (T*≥0), is shown in FIG. 12A. In a range in which the torque deviation $\Delta T$ is larger than or equal to a predetermined value −A (A>0) and smaller than or equal to a predetermined value +A, the current increase-decrease amount $\Delta I_\gamma^*$ is set to zero. Then, the current increase-decrease amount $\Delta I_\gamma^*$ is set so as to be smaller than zero by a larger amount (linearly reduces in the example shown in FIG. 12A) as the torque deviation $\Delta T$ becomes smaller than the predetermined value −A by a larger amount. In addition, the current increase-decrease amount $\Delta I_\gamma^*$ is set so as to be larger than zero by a larger amount (linearly increases in the example of FIG. 12A) as the torque deviation $\Delta T$ becomes larger than the predetermined value +A.

In the case where the sign of the command steering torque T* is positive (T*≥0), if the torque deviation $\Delta T$ (=T−T*) is larger than or equal to zero, the absolute value of the detected steering torque T is larger than the absolute value of the command steering torque T* and, therefore, motor torque (assist torque) is insufficient. Then, when the torque deviation $\Delta T$ is larger than the predetermined value +A, the current increase-decrease amount $\Delta I_\gamma^*$ is set to a positive value so as to compensate for shortage of assist torque. In this case, as the absolute value of the torque deviation $\Delta T$ increases, the absolute value of the current increase-decrease amount $\Delta I_\gamma^*$ also increases (becomes a positive value of which the absolute value is large).

On the other hand, if the torque deviation $\Delta T$ (=T−T*) is smaller than zero, the absolute value of the detected steering torque T is smaller than the absolute value of the command steering torque T* and, therefore, motor torque (assist torque) is excessive. Then, when the torque deviation $\Delta T$ is smaller than the predetermined value −A, the current increase-decrease amount $\Delta I_\gamma^*$ is set to a negative value in order to reduce assist torque. In this case, as the absolute value of the torque deviation $\Delta T$ increases, the absolute value of the current increase-decrease amount $\Delta I_\gamma^*$ also increases (becomes a negative value of which the absolute value is large).

Figure 12B:
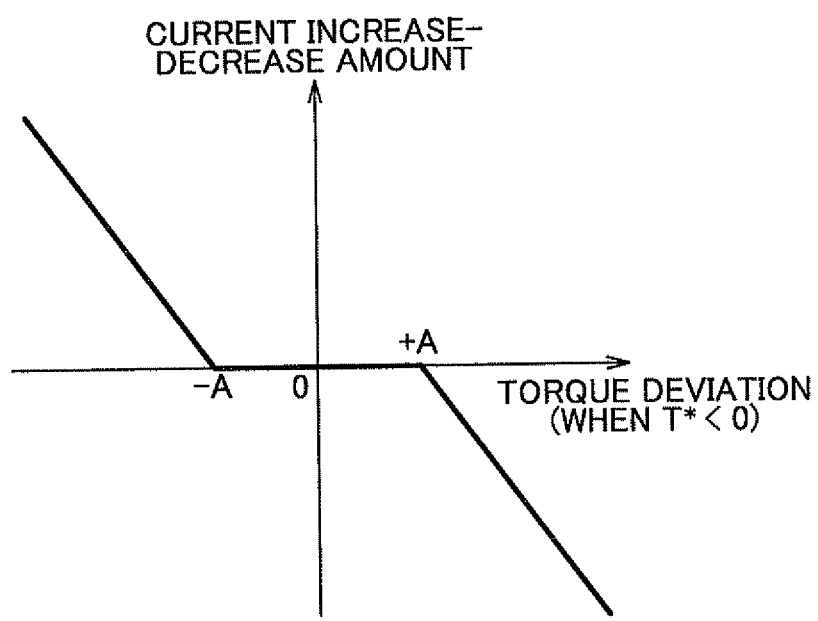
FIG. 12B is a graph that shows an example of setting a current increase-decrease amount with respect to a torque deviation in the case where the sign of a command steering torque is negative.

An example of setting a current increase-decrease amount $\Delta I_\gamma^*$ with respect to a torque deviation $\Delta T$ when the sign of the command steering torque T* is negative (T*<0) is shown in FIG. 12B. In the range in which the torque deviation $\Delta T$ is larger than or equal to the predetermined value −A and smaller than or equal to the predetermined value +A, the current increase-decrease amount $\Delta I_\gamma^*$ is set to zero. Then, the current increase-decrease amount $\Delta I_\gamma^*$ is set so as to be larger than zero by a larger amount (linearly increases in the example of FIG. 12B) as the torque deviation $\Delta T$ becomes smaller than the predetermined value −A by a larger amount. In addition, the current increase-decrease amount $\Delta I_\gamma^*$ is set so as to be smaller than zero by a larger amount (linearly reduces in the example of FIG. 12B) as the torque deviation $\Delta T$ becomes larger than the predetermined value +A by a larger amount.

In the case where the sign of the command steering torque T* is negative (T*<0), if the torque deviation $\Delta T$ (=T−T*) is larger than or equal to zero, the absolute value of the detected steering torque T is smaller than the absolute value of the command steering torque T* and, therefore, motor torque (assist torque) is excessive. Then, when the torque deviation $\Delta T$ is larger than the predetermined value +A, the current increase-decrease amount $\Delta I_\gamma^*$ is set to a negative value in order to reduce assist torque. In this case, as the absolute value of the torque deviation $\Delta T$ increases, the absolute value of the current increase-decrease amount $\Delta I_\gamma^*$ also increases (becomes a negative value of which the absolute value is large).

On the other hand, if the torque deviation $\Delta T$ (=T−T*) is smaller than zero, the absolute value of the detected steering torque T is larger than the absolute value of the command steering torque T* and, therefore, motor torque (assist torque) is insufficient. Then, when the torque deviation $\Delta T$ is smaller than the predetermined value −A, the current increase-decrease amount $\Delta I_\gamma^*$ is set to a positive value so as to compensate for shortage of assist torque. In this case, as the absolute value of the torque deviation $\Delta T$ increases, the absolute value of the current increase-decrease amount $\Delta I_\gamma^*$ also increases (becomes a positive value of which the absolute value is large).

The current increase-decrease amount $\Delta I_\gamma^*$ computed by the command current increase-decrease amount computing unit 61 is added to the immediately preceding value $I_\gamma^*(n-1)$ (n is the number of the present computation cycle) of the command current value $I_\gamma^*$ by the adder 62 ($Z^{-1}$ indicates the immediately preceding value of a signal). Thus, the command current value $I_\gamma^*$ in the present computation cycle is computed. That is, the command current increase-decrease amount computing unit 61 and the adder 62 constitute a command current value computing device for computing the command current value $I_\gamma^*$. However, the initial value of the command current value $I_\gamma^*$ is a predetermined value (for example, zero). The command current value $I_\gamma^*$ obtained by the adder 62 is given to the high/low limit limiter 63. The high/low limit limiter 63 limits the command current value $I_\gamma^*$, obtained by the adder 62, to a value within a range between a low limit value $\xi_{min}$ ($\xi_{min} \geq 0$) and a high limit value $\xi_{max}$ ($\xi_{max}$>4 min). The low limit value $\xi_{min}$ is set in advance. The low limit value $\xi_{min}$ is, for example, set to zero. On the other hand, the high limit value $\xi_{max}$ is set by the high limit value setting unit 64.

When the command current value $I_\gamma^*$ obtained by the adder 62 is larger than or equal to the low limit value $\xi_{min}$ and smaller than or equal to the high limit value $\xi_{max}$, the high/low limit limiter 63 outputs the command current value $I_\gamma^*$ without limitation. When the command current value $I_\gamma^*$ obtained by the adder 62 is smaller than the low limit value $\xi_{min}$, the high/low limit limiter 63 outputs the low limit value $\xi_{min}$ as the command current value $I_\gamma^*$ in the present computation cycle. When the command current value $I_\gamma^*$ obtained by the adder 62 is larger than the high limit value $\xi_{max}$, the high/low limit limiter 63 outputs the high limit value $\xi_{max}$ as the command current value $I_\gamma^*$ in the present computation cycle.

The high limit value setting unit 64 sets the high limit value $\xi_{max}$ based on the vehicle speed-vs.-high limit value map set by the map creating/updating unit 39 and the vehicle speed detected by the vehicle speed sensor 6. Specifically, the high limit value setting unit 64 acquires the vehicle speed detected by the vehicle speed sensor 6 in each predetermined computation cycle. Then, the high limit value setting unit 64 obtains the high limit value $\xi_{max}$ corresponding to the vehicle speed from the vehicle speed-vs.-high limit value map set by the map creating/updating unit 39, and sets the obtained high limit value $\xi_{max}$ in the high/low limit limiter 63.

Figure 13:
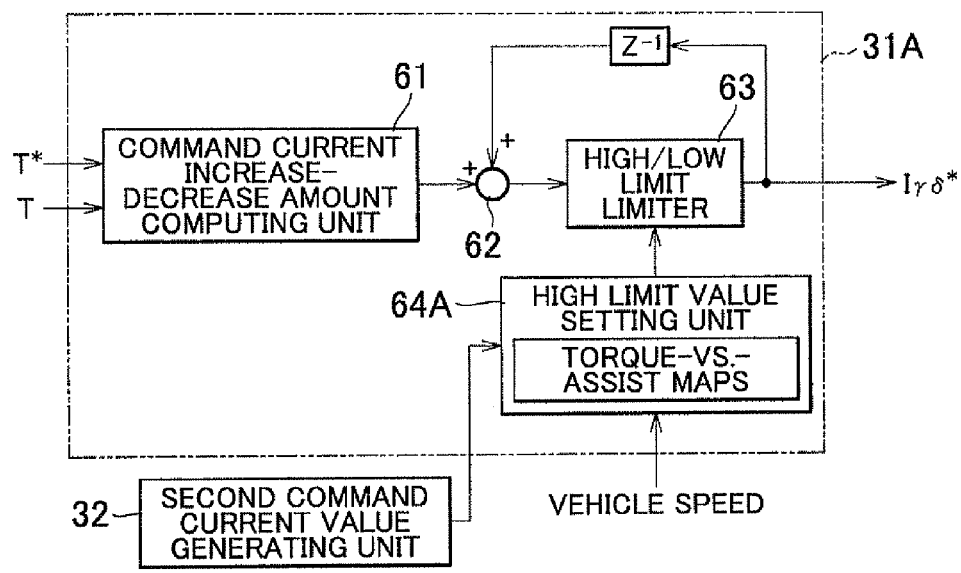
FIG. 13 is a block diagram that shows an alternative example of the first command current value generating unit.

FIG. 13 is a block diagram that shows an alternative example of the first command current value generating unit. In FIG. 13, the components that are the same as those shown in FIG. 11 are denoted by the same reference numerals as those in FIG. 11. In this first command current value generating unit 31A, the operation of a high limit value setting unit 64A differs from that of the high limit value setting unit 64 shown in FIG. 11. In addition, when the first command current value generating unit 31A is employed, the map creating/updating unit 39 shown in FIG. 1 is no longer required.

As indicated by the broken line in FIG. 1 or shown in FIG. 13, the torque-vs.-assist map selected by a user, or the like, from among the torque-vs.-assist maps by vehicle type, stored in the second command current value generating unit 32, is set in the high limit value setting unit 64A by the second command current value generating unit 32. When the currently selected torque-vs.-assist map is changed, the second command current value generating unit 32 updates the torque-vs.-assist map, set in the high limit value setting unit 64A, using the changed torque-vs.-assist map.

Figure 14:
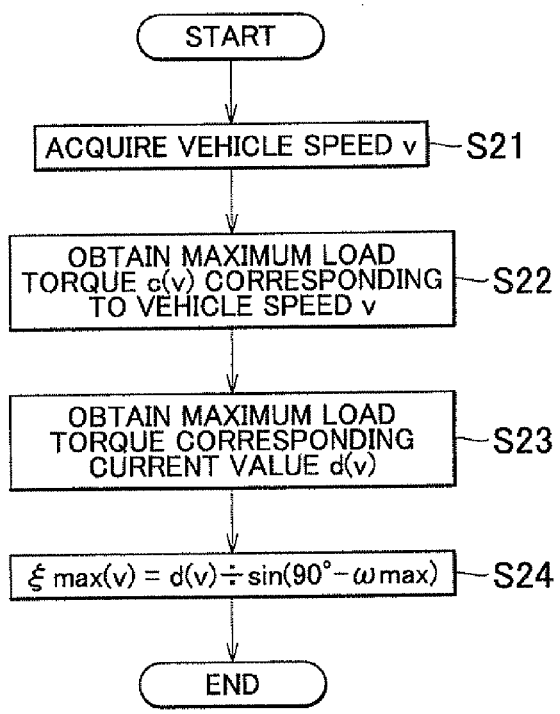
FIG. 14 is a flowchart that shows the procedure of high limit value computing process executed by a high limit value setting unit.

The high limit value setting unit 64A stores the torque-vs.-assist map that is set or updated by the second command current value generating unit 32. The high limit value setting unit 64A obtains a high limit value $\xi_{max}$ based on the stored torque-vs.-assist map and the vehicle speed detected by the vehicle speed sensor 6, and sets the obtained high limit value $\xi_{max}$ in the high/low limit limiter 63. FIG. 14 is a flowchart that shows the procedure of high limit value computing process executed by the high limit value setting unit 64A. This process is executed in each predetermined computation cycle.

The high limit value setting unit 64A acquires a vehicle speed detected by the vehicle speed sensor 6 (step S21). In the description of FIG. 14, the acquired vehicle speed is termed "vehicle speed v". Subsequently, a maximum load torque c(v) corresponding to the vehicle speed v is obtained based on a torque-vs.-assist map (assist characteristic) corresponding to the vehicle speed v acquired in step S21 from among the stored torque-vs.-assist maps (step S22). The maximum load torque c(v) corresponding to the vehicle speed v is obtained by computing the sum of a predetermined steering toque a and a target assist torque b(v) corresponding to the predetermined steering torque a in the torque-vs.-assist map corresponding to the vehicle speed v. Here, the predetermined steering torque a is, for example, set to a predetermined value larger than or equal to 5 Nm (for example, 6 Nm).

Subsequently, the high limit value setting unit 64A uses the maximum load torque c(v) corresponding to the vehicle speed v, obtained in step S22, and the torque constant $K_T$ of the motor 3 to obtain a γ-axis current value (maximum load torque corresponding current value d(v)) for causing the motor 3 to generate the maximum load torque c(v) corresponding to the vehicle speed v based on the following mathematical expression 10 (step S23).

$$d(v)=c(v)/K_T \qquad \text{Mathematical Expression 10}$$

After that, the high limit value setting unit 64A uses the maximum load torque corresponding current value d(v) corresponding to the vehicle speed v, obtained in step S23, and the limiting value $\omega_{max}$ of the addition angle limiter 24 to obtain a high limit value $\xi_{max}(v)$ (the high limit value of the γ-axis command current value $I_\gamma^*$) corresponding to the vehicle speed v based on the following mathematical expression 11 (step S24).

$$\xi_{max}(v)=d(v)/\sin(90°-\omega_{max}) \qquad \text{Mathematical Expression 11}$$

In the above described embodiment and alternative example, the high limit value $\xi_{max}$ of the command current value $I_\gamma^*$ is set based on a vehicle speed, so it is possible to set the high limit value of the command current value $I_\gamma^*$ to an appropriate value. Thus, it is possible to improve electric power efficiency and stabilize control. The embodiment of the invention is descried above; however, the invention may be implemented in other embodiments. For example, in the above described embodiment, the maximum load torque c(v) corresponding to the vehicle speed v is obtained by computing the sum of a predetermined steering torque a and a target assist torque b(v) corresponding to the predetermined steering torque a in the torque-vs.-assist map corresponding to the vehicle speed v. Instead, the maximum load torque c(v) corresponding to the vehicle speed v may be obtained by another method, for example, from the specifications of the vehicle.

Furthermore, in the above described embodiment, the invention is applied to the electric power steering system. Instead, the invention may also be applied to control over a motor for an electric pump hydraulic power steering system or control over a brushless motor provided in vehicle steering systems, such as a steer-by-wire (SBW) system and a variable gear ratio (VGR) steering system, other than the power steering system.

With the configuration according to the invention, a motor is driven in accordance with an axis current value (hereinafter, referred to as "imaginary axis current value") on a rotation coordinate system (γδ coordinate system; hereinafter, referred to as "imaginary rotation coordinate system", and the coordinate axes of the imaginary rotation coordinate system are termed "imaginary axes") according to a control angle, while the control angle is updated by adding an addition angle to the control angle in each computation cycle. Thus, while the control angle is updated, that is, while the coordinate axes (imaginary axes) of the imaginary rotation coordinate system are updated, the motor is driven in accordance with imaginary axes current values to thereby make it possible to generate a required torque. In this way, it is possible to generate appropriate torque from the motor without using a rotation angle sensor.

In the invention, a steering torque applied to an operating member that is operated to steer a vehicle is detected by a steering torque detecting device. In addition, a command steering torque is set by a command steering torque setting device as a target value of the steering torque. Then, the addition angle computing device is used to compute an addition angle based on a torque deviation that is a deviation between a detected steering torque and a command steering torque. The addition angle computing device operates, for example, so as to compute an addition angle to bring the detected steering torque into coincidence with the command steering torque. Thus, the addition angle is determined such that the detected steering torque coincides with the command steering torque, and the control angle according to the addition angle is determined. Thus, by appropriately determining a command steering torque, the motor may be caused to generate an appropriate driving force and then the appropriate driving force may be applied to the steering mechanism. That is, a load angle that is a deviation amount between the imaginary axis and the coordinate axis of the rotation coordinate system (dq coordinate system) according to the magnetic pole direction of the rotor is brought to a value corresponding to the command steering torque. As a result, appropriate torque is generated from the motor, and a driving force corresponding to a driver's steering intention may be applied to the steering mechanism.

In addition, in the invention, the command current value computing device is used to set a command current value that is a target value of an axis current value based on a torque deviation that is a deviation between a detected steering torque and a command steering torque. Thus, it is possible to control the magnitude of motor torque based on the torque deviation. Therefore, it is possible to quickly bring the detected steering torque into coincidence with the command steering torque. Furthermore, in the invention, a command current value limiting device is used to limit the command current value, obtained by the command current value computing device, to a value at or below a high limit value. The high limit value is set by a high limit value setting device based on a vehicle speed detected by a vehicle speed detecting device. If the high limit value of the command current value is excessively large, there is a possibility that heat generated due to motor resistance will increase, so electric power efficiency deteriorates. On the other hand, when the high limit value of the command current value is excessively small, there is a possibility that required motor torque will not be generated, so control becomes unstable. In the invention, the high limit value of the command current value is set based on a vehicle speed, so it is possible to set the high limit value of the command current value to an appropriate value. Thus, it is possible to improve electric power efficiency and stabilize control. With this configuration, a high limit value based on the maximum load torque corresponding to the vehicle speed detected by the vehicle speed detecting device and the addition angle limiting value may be set as the high limit value of the command current value. For example, when the addition angle limiting value is set to $\omega_{max}$, in a state where the command current value is set to the high limit value, it is possible to set a high limit value such that assist torque corresponding to the maximum load torque is generated from the motor when the load angle is $(90°-\omega_{max})$. Thus, it is possible to control the load angle within a desirable range.

Furthermore, with the configuration according to the invention, a high limit value based on the maximum load torque corresponding to the vehicle speed detected by the vehicle speed detecting device and the addition angle limiting value may be set as the high limit value of the command current value. For example, when the addition angle limiting value is set to $\omega_{max}$, in a state where the command current value is set to the high limit value, it is possible to set a high limit value such that assist torque corresponding to the maximum load torque is generated from the motor when the load angle is $(90°-\omega_{max})$. Thus, it is possible to control the load angle within a desirable range.

The addition angle limiting value may be, for example, a value determined by the following mathematical expression. However, the "maximum rotor angular velocity" in the following mathematical expression is a maximum value of rotor angular velocity in electrical angle.

Addition angle limiting value=Maximum rotor angular velocity×Computation cycle

For example, when the rotation of the motor is transmitted to the steering shaft of the vehicle steering system via the reduction mechanism having a predetermined reduction ratio, the maximum rotor angular velocity is given by Maximum steering angular velocity (Maximum rotation angular velocity of the steering shaft)×Reduction ratio×Number of pole pairs. The "number of pole pairs" is the number of the pairs of magnetic poles (pairs of N pole and S pole) of the rotor.

The vehicle steering system according to the invention may further include a steering angle detecting device that detects a steering angle of the operating member, and the command steering torque setting device may set a command steering torque based on the steering angle detected by the steering angle detecting device. With this configuration, the command steering torque is set based on the steering angle of the operating member, so appropriate torque based on the steering angle may be generated from the motor, and it is possible to bring a steering torque, applied to the operating member by a driver, to a value based on the steering angle. Thus, a favorable steering feel may be obtained.

The command steering torque setting device may set a command steering torque based on the vehicle speed detected by the vehicle speed detecting device. With this configuration, a command steering torque is set based on the vehicle speed, so so-called vehicle speed sensitive control may be executed. As a result, a favorable steering feel may be obtained. For example, the command steering torque is reduced as the vehicle speed increases, that is, as the vehicle runs at a higher speed, to thereby make it possible to obtain an excellent steering feel.

Other than the above, various design changes may be performed within the scope of the appended claims.

What is claimed is:

1. A vehicle steering system that applies a driving force to a steering mechanism of a vehicle using a motor having a rotor and a stator that faces the rotor, the vehicle steering system comprising:
a current driving device that drives the motor based on an axis current value on a rotation coordinate system that rotates in accordance with a control angle used as a rotation angle in control;
a control angle computing device that obtains a present value of the control angle by adding an addition angle to an immediately preceding value of the control angle in each predetermined computation cycle without using an input from a rotational angle sensor that detects a rotation angle of the rotor so that the control angle is determined independently from the rotation angle of the rotor;
a vehicle speed detecting device that detects a speed of the vehicle;
a steering torque detecting device that detects a steering torque applied to an operating member that is operated to steer the vehicle;
a command steering torque setting device that sets a command steering torque used as a target value of the steering torque;
an addition angle computing device that computes, without detecting a change of the rotation angle of the rotor, the addition angle based on a torque deviation that is a deviation between the detected steering torque detected by the steering torque detecting device and the command steering torque set by the command steering torque setting device;
a command current value computing device that obtains a command current value that is a target value of the axis current value based on the torque deviation;
a command current value limiting device that limits the command current value, obtained by the command current value computing device, to a value at or below a high limit value; and
a high limit value setting device that sets the high limit value based on the vehicle speed detected by the vehicle speed detecting device.

2. The vehicle steering system according to claim 1, wherein
the vehicle steering system is an electric power steering system that transmits a driving force of the motor as an assist torque to the steering mechanism to assist steering, the vehicle steering system further comprising:
a torque-vs.-assist map that stores an assist characteristic indicating a correlation of a target assist torque with respect to a steering torque for each vehicle speed, wherein
the high limit value setting device sets a high limit value based on the assist characteristic corresponding to the vehicle speed detected by the vehicle speed detecting device.

3. The vehicle steering system according to claim 1, wherein
the vehicle steering system is an electric power steering system that transmits a driving force of the motor as an assist torque to the steering mechanism to assist steering, the vehicle steering system further comprising:
a torque-vs.-assist map that stores an assist characteristic indicating a correlation of a target assist torque with respect to a steering torque for each vehicle speed; and
an addition angle limiting device that limits an absolute value of the addition angle to a value at or below a predetermined addition angle limiting value, wherein
the high limit value setting device sets a high limit value based on a maximum load torque corresponding to the vehicle speed, obtained from the torque-vs.-assist map and the vehicle speed detected by the vehicle speed detecting device, and the addition angle limiting value.

4. The vehicle steering system according to claim 3, wherein
the maximum load torque corresponding to the vehicle speed is a sum of a predetermined steering torque and an assist torque corresponding to the predetermined steering torque in the assist characteristic corresponding to the vehicle speed detected by the vehicle speed detecting device.

5. The vehicle steering system according to claim 3, wherein
the high limit value setting device further includes:
a vehicle speed-vs.-high limit value map that stores a correlation of the high limit value with respect to a vehicle speed; and
a device that, when the torque-vs.-assist map is changed, updates the vehicle speed-vs.-high limit value map in accordance with the changed torque-vs.-assist map.

6. The vehicle steering system according to claim 4, wherein
the high limit value setting device further includes:
a vehicle speed-vs.-high limit value map that stores a correlation of the high limit value with respect to a vehicle speed; and
a device that, when the torque-vs.-assist map is changed, updates the vehicle speed-vs.-high limit value map in accordance with the changed torque-vs.-assist map.

7. The vehicle steering system according to claim 1, further comprising:
an addition angle limiting device that limits an absolute value of the addition angle to a value at or below a predetermined addition angle limiting value, wherein
the high limit value setting device sets a high limit value based on a maximum load torque corresponding to the vehicle speed detected by the vehicle speed detecting device and the addition angle limiting value.

* * * * *